United States Patent Office 2,709,305
Patented May 31, 1955

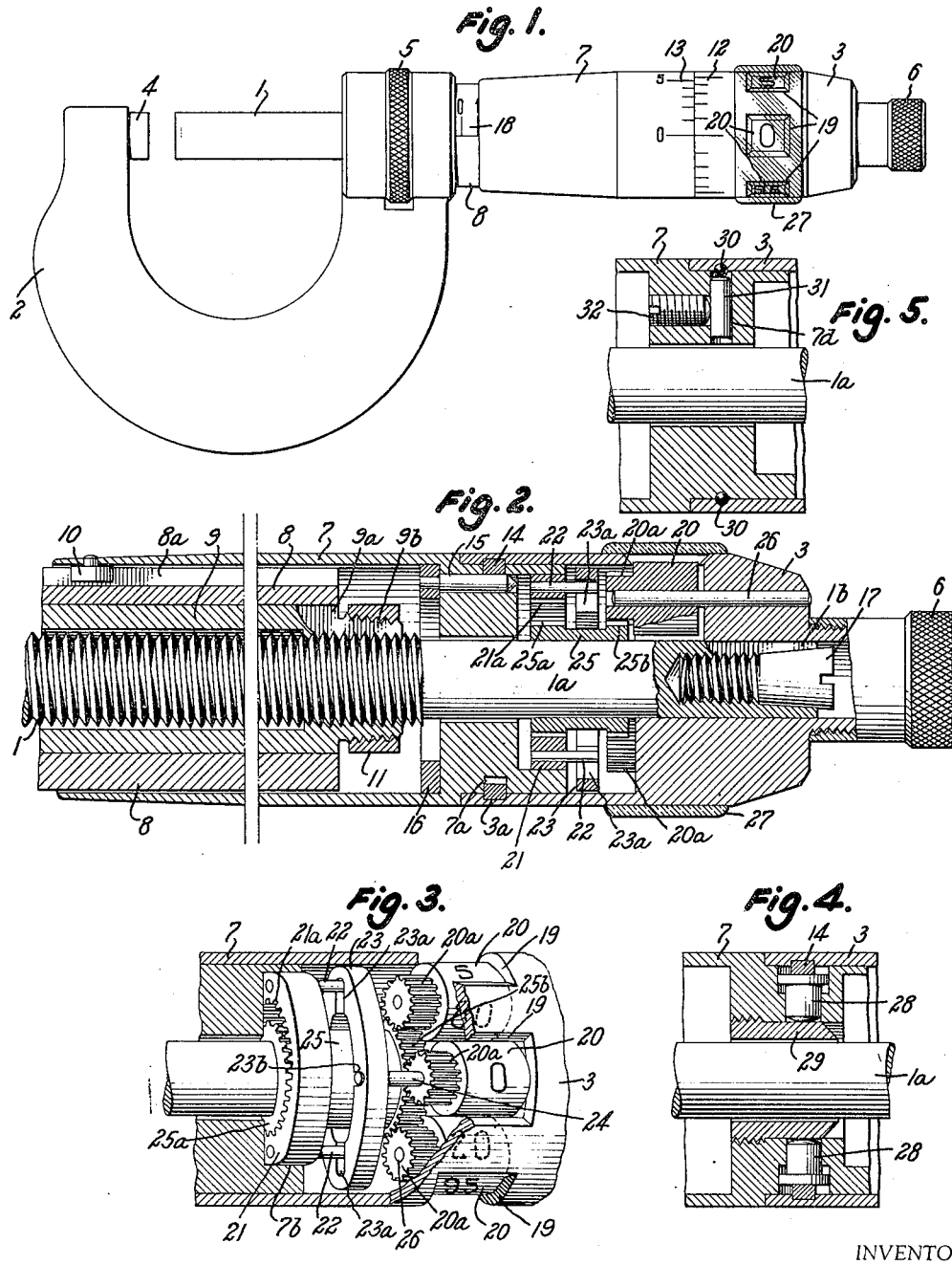

2,709,305

MICROMETER INDICATOR FOR MEASURING DEVICES

Hans Meyer, Renens, Switzerland

Application December 12, 1952, Serial No. 325,628

Claims priority, application Switzerland December 15, 1951

12 Claims. (Cl. 33—166)

This invention relates to micrometer indicators for measuring devices, and more particularly to micrometer indicators of the type in which a driving mechanism rotates a graduated drum or disk through a plurality of complete rotations while effecting an advance of the driven member by one full unit.

Graduated devices or indicators of this general type may be employed, for example, in micrometer calipers, angle protractors, and worm drives for measuring purposes; and the indicating drum or disk may be graduated in linear or angular values, or in the case of variable condensers of radio or radar equipment, the graduations may be in kilocycles or megacycles per second. When several turns of the graduated drum or disk correspond to a one unit displacement of the driven member, the numerals on the graduated drum or disk are accurate for only one of the several turns of a one unit displacement, and they must be multiplied by the number of rotations to obtain a reading of the true value. This is a cause of frequent errors in interpretation, and it has been proposed to have auxiliary graduated elements rotated by the fine graduation drum to facilitate the reading of the true value.

Some of the prior proposals have been open to the objection of periodic variations in measuring accuracy due to periodic variations in internal friction as the auxiliary elements were brought successively into view in apertures of the graduated drum.

Objects of the present invention are to provide micrometer indicators in which a plurality of auxiliary graduated drums are located within and visible through openings in the primary drum, the auxiliary drums being driven from the primary drum by gearing of constant frictional resistance.

Objects are to provide micrometer indicators of the type stated in which the graduated edge of the indicator drum slides along or rotates with respect to the adjacent edge of a member which carries a reference mark and is non-rotatable with respect to the measuring apparatus but slidable thereon to maintain the graduation marks closely adjacent the reference mark.

These and other objects and the advantages of the invention will be apparent from the following specification when taken with the accompanying drawing, in which:

Fig. 1 is a front elevation of micrometer calipers embodying the invention;

Fig. 2 is a central longitudinal section through the measuring end of the calipers, and on a larger scale;

Fig. 3 is a fragmentary perspective view, on a still larger scale, of the indicator mechanism shown in Fig. 2; and Figs. 4 and 5 are fragmentary vertical sectional views showing other arrangements for coupling the rotatable thimble and cooperating non-rotatable sleeve of the indicator mechanism.

In the drawing, the reference numeral 1 identifies the micrometer screw or spindle which is supported in a stirrup-shaped frame 2 in known manner, and is adjustable towards and away from an anvil 4 by rotation of a drum 3. The spindle 1 may be locked in any desired position by the usual clamping device 5, and the drum 3 is preferably rotated by a cap 6 which includes a maximum torque drive mechanism, not shown.

The drum 3 has a snug telescoping fit over and is rotatable on the reduced diameter outer end of a sleeve 7 which can slide with respect to a sleeve 8 which is pressed tightly upon a barrel or tubular extension 9 of the yoke frame 2 of the calipers. The sleeves 7 and 8 are locked against relative rotation by a key 10 which is carried by the sleeve 7 and slidable in a keyway 8a cut in the outer surface of the sleeve 8. The major portion of the barrel 9 is of such internal diameter as to clear the threaded portion of the spindle 1, but its outer slotted end 9a is threaded to receive the threaded portion of spindle 1 and has an externally threaded conical extension 9b on which a clamping nut 11 is adjustably threaded to regulate the play between the threads and determine the frictional resistance to rotation of the spindle 1 by the drum 3. The inner edge of the drum 3 is provided with a circumferential scale of graduations 12, and the mating edge of the sleeve 7 is provided with reference graduations 13 which preferably are of vernier type.

The drum 3 and sleeve 7 are locked against relative axial displacement by a split ring 14 seated in mating circumferential grooves 3a and 7a cut in the drum 3 and sleeve 7, respectively. The split ring 14 is resilient and normally of relatively small diameter to seat within the groove 7a of sleeve 7. To assemble the parts, the drum 3 is telescoped over the sleeve 7 when the ring 14 is within the groove 7a, and the ring 14 is then expanded by forcing into the sleeve 7 a set of locking pins 15 which are, for convenience of assembly, mounted upon a ring 16.

This assembly of the drum 3 and sleeve 7 is made prior to the mounting of the assembly upon the spindle 1. The outer portion 1a of the spindle is cylindrical and its extreme outer end 1b is radially split and has a bore internally threaded to receive a screw 17 with a conical head. The drum 3 has a bore of slightly larger diameter than the normal diameter of the end portion 1b of the spindle 1, and the drum 3 and assembled sleeve 7 may be secured to the spindle 1 by slipping the assembly over the spindle 1, removing the end cap 6, and turning down the screw 17 to expand the end 1b of the spindle into locking engagement with the drum 3. The cap 6 is then applied to the drum 3 and the assembly of the instrument is completed.

The sleeve 8 is provided with the usual coarse scale of graduations 18 which is progressively exposed as the sleeve 7 moves axially with the spindle 1 as it separates from the anvil 4. These coarse graduations may be in tenths of an inch when the calipers are graduated in British units of linear measurement, and the spindle 1 has a fine thread such that N complete rotations of the drum 3 displace the spindle by one unit of the scale 18. In accordance with the invention, the drum 3 is provided with window openings 19 at each of which a small cylinder 20 bearing appropriate numerals is exposed to view. The several cylinders 20 are so rotated by the drum 3 that they make one complete rotation for each N rotations of the drum 3, and they each bear a number N of numerals which each correspond to the fractional value of a one-unit displacement of the spindle when that numeral is exposed to view in substantial alinement with the reference graduation 13. In the illustrated embodiment in which the scale 12 has twenty-five divisions of one one-thousandth inch value each, there are five cylinders 20 and each bears four numerals as the construction is such that four full turns of the drum 3 are required to complete a one-unit displacement of the spindle 1.

The cylinders are carried by and rotate with the drum 3, and each cylinder is turned through 90° for each full turn of the drum 3 by gearing which will be described later. Each quarter-turn of a cylinder therefore corresponds to a movement of the spindle 1 by twenty-five one-thousandths of an inch, and the cylinders 20 carry numeral values of 0-25-50-75; 5-30-55-80; 10-35-60-85; 15-40-65-90 and 20-45-70-95, respectively. These numbers are displayed in sequence at the opening 19 which alines with the zero mark of scale 13 when drum 3 is rotated to separate the spindle 1 from the anvil 4. The scale 18 is graduated in values of one-tenth inch and, as shown in Fig. 1, the gap between spindle 1 and anvil 4 is exactly 0.100 inch. On initial rotation of drum 3 to increase the width of the gap (counterclockwise as viewed from the right of Figs. 1 and 3), the upper cylinder 20, as seen in Figs. 1 and 3, moves downward to display its initial number "5" at the window opening 19 which alines with the zero mark of graduations 13. The gap spacing is then 0.105 inch. Continued rotation of drum 3 in the same sense brings the other cylinders into line with the zero mark of graduations 13 to display their initial numeral values in succession and, at the completion of one full turn of drum 3, each cylinder 20 is back in its starting position but has been rotated through 90°. The numeral displayed in line with the zero mark of scale 13 is therefore "25," and the gap between spindle 1 and anvil 4 is 0.1025 inch. On further rotations of the drum 3, the several cylinders move into alinement with the zero mark of graduations 13 to display in sequence their second, third and fourth numeral values. At the completion of four full rotations of the drum 3, the end of sleeve 7 alines with the next one-tenth inch graduation of the scale 18. The size of the gap may therefore be read to values of five one-thousandths of an inch without interpolation and without possibility of error.

The gearing for rotating the cylinders 20 by the drum 3 includes an internal gear wheel 21 journalled in an eccentrically located recess 7b in the outer end of the sleeve 7. The gear wheel 21 is driven by the drum 3 through a coupling comprising a pair of diametrically arranged pins 22 secured to the gear 21 and slidable in radial slots 23a of an annulus 23, and a pair of pins 24 rigidly secured to the drum 3 and slidable in another set of radial slots 23b of the annulus 23, the sets of slots being in planes at right angles to each other. This type of universal joint has the advantage of small size but other forms of couplings for driving the gear 21 from and in the same direction as the drum 3 may be employed.

A sleeve or bushing 25 is freely rotatable on the cylindrical spindle portion 1a, and has a gear 25a at its inner end in mesh with the internal teeth 21a of the gear wheel 21, and a gear 25b at its outer end in mesh with the gears 20a of the several small cylinders 20. One of the cylinders 20 may be journalled on a drive pin 24, and the others are journalled on shafts 26 supported by the drum 3. The cylinders 20 preferably project into the window openings 19, since this improves the readability of the numerals carried by the cylinders and also limits the longitudinal play of the cylinders by the sides of the openings 19. To prevent dirt and grit from finding its way into the inner parts of the mechanism, the window openings 19 may be covered by a transparent material. As shown in Figs. 1 and 2, it is convenient and preferable to cover all of the openings with a single transparent ring 27 of glass or a plastic.

When the drum 3 is rotated to adjust the spindle 1, the gear wheel 21 and the bushing 25 are rotated in the same sense but the cylinders 20 rotate in the opposite sense, and this arrangement increases the readability to a considerable extent.

The calipers may be calibrated or reset in a very simple manner by removing the cap 6 to expose the conical head screw 17 which expands the end 1b of the spindle into firm engagement with the drum 3 of the measuring system. On loosening of the screw 17, the drum 3 may be moved axially of and rotated with respect to the spindle 1 to reset the same into appropriate position.

In place of the axially inserted locking pins 15 which are shown in Fig. 2, the spring ring 14 may be expanded to seat with the groove 3a of the drum 3 by radially movable pins 28 which are forced outwardly by a bushing 29 which is threaded into the end of the sleeve 7, see Fig. 4.

Another embodiment, as shown in Fig. 5, employs a series of ball bearings 30 in place of the split ring 14 to lock the drum 3 and sleeve 7 against relative axial movement. One race of the ball bearing is formed in the drum 3 and the other is in the sleeve 7. The balls can be introduced into the races through a radial opening 7d in the sleeve 7, and retained in place by introducing a pin 31 into the radial opening and securing it there by a set screw 32.

In each of the described embodiments, the sleeve areas and the drum 3 are so joined that the friction between the parts is uniform over the entire range of the calipers or driven spindle, and the friction within the gearing is also uniform since there is no change in the drive mechanism throughout the entire range of measurement. This condition of constant friction over the range is essential for accurate measurements.

While the invention has been described with reference to calipers in which the spindle 1 is rotated by the drum 3, it is to be understood that the invention is equally applicable to constructions in which the spindle 1 rotates the drum 3, the spindle being integral with or appropriately coupled to a shaft which is driven from a source other than the indicator mechanism.

I claim:

1. A micrometer indicator comprising a threaded spindle rotatably mounted in said micrometer, an indicator drum rotatable with said threaded spindle, said drum bearing a circumferential scale of graduations at the inner end thereof, a non-rotating sleeve coaxial with said drum and having an outer end bearing a reference graduation cooperating with said circumferential scale of graduations, a number N of rotations of said drum corresponding to a one-unit displacement of said spindle, said drum being provided with a plurality of uniformly spaced window openings, cylinders journalled on said drum and exposed to view at the respective window openings, and motion transmitting means within and driven by said drum to rotate said cylinders one turn for each N rotations of said drum, each cylinder bearing a number N of numerals each corresponding to the fractional value of a one-unit displacement of said spindle when that numeral is exposed to view in approximate alinement with the reference graduation; said motion transmitting mechanism comprising a common continuously engaged gearing for all of said cylinders.

2. A micrometer indicator as recited in claim 1, wherein said gearing comprises a gear on each cylinder, a bushing journalled on said spindle and having on its outer end a gear meshing with the gears of all of said cylinders, an internal gear journalled on said non-rotating sleeve, universal joint means coupling said internal gear to said drum for rotation thereby, and a gear on the inner end of said bushing in mesh with said internal gear.

3. A micrometer indicator as recited in claim 2, wherein said internal gear is journalled on said non-rotating sleeve surrounding and eccentrically of the axis of said spindle; and wherein said universal joint comprises an annulus provided with two sets of radial slots, pins secured to said drum and extending through one set of radial slots, and pins secured to said internal gear and extending through the other set of radial slots.

4. A micrometer indicator as recited in claim 3, wherein said sets of radial slots are in planes at right angles to each other.

5. A micrometer indicator as recited in claim 1, wherein said gearing includes an individual gear on each cylinder, and a gear meshing with all of said individual gears and driven by and in the same direction as said drum, whereby said gearing rotates said cylinders in a direction opposite to the direction of rotation of said drum.

6. A micrometer indicator as recited in claim 1, wherein said cylinders project into and are of less axial length than the width of said window openings of said drum, whereby axial play of said cylinders is limited by the sides of said window openings.

7. A micrometer indicator as recited in claim 1, wherein said window openings are covered and substantially sealed by a transparent ring.

8. A micrometer indicator as recited in claim 1, wherein the outer end of said non-rotatable sleeve is of reduced diameter, and the inner end of said drum is telescoped over the reduced diameter outer end of said sleeve; in combination with means comprising a resilient split ring sealed in mating circumferential recesses in said drum and sleeve securing said drum and sleeve against relative axial displacement.

9. A micrometer indicator as recited in claim 8, wherein said split ring has a normal diameter less than the internal diameter of said drum, in combination with means for expanding said ring to seat in part within the circumferential recess of said drum.

10. A micrometer indicator as recited in claim 9, wherein said expanding means comprises pin means extending axially of said sleeve to force the ring radially outwards.

11. A micrometer indicator as recited in claim 9, wherein said expanding means comprises pin means mounted radially in said sleeve, and means for forcing said pin means radially outwards.

12. A micrometer indicator as recited in claim 1, wherein the outer end of said non-rotatable sleeve is of reduced diameter, the inner end of said drum is telescoped over the reduced diameter outer end of said sleeve, and said sleeve and drum are provided with mating circumferential recesses constituting ball races, one of said races having a radial opening into the same for introduction of bearing balls, balls within said races securing said sleeve and drum against relative axial displacement, and means for closing said radial opening to retain said balls within said races.

References Cited in the file of this patent

UNITED STATES PATENTS

| | | |
|---|---|---|
| 373,705 | Wells | Nov. 22, 1887 |
| 990,655 | Jacques | Apr. 25, 1911 |
| 1,121,632 | Jacques | Dec. 22, 1914 |